No. 702,513. Patented June 17, 1902.
W. R. WELSH.
STALK CUTTER.
(Application filed Aug. 24, 1900.)
(No Model.)
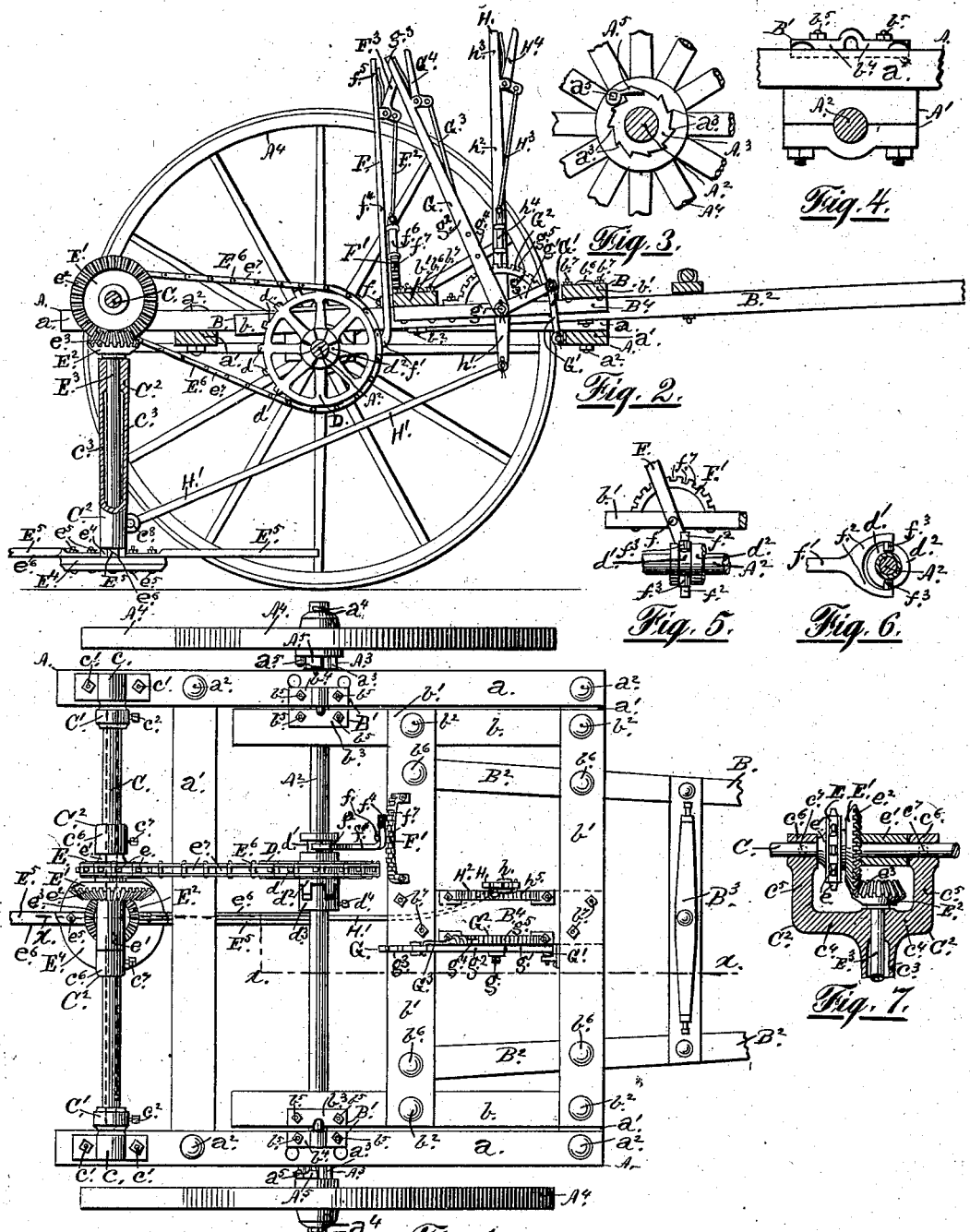
WITNESSES:
INVENTOR
Wesley R. Welsh,
BY
ATTORNEY.

UNITED STATES PATENT OFFICE.

WESLEY R. WELSH, OF PARKESBURG, PENNSYLVANIA.

STALK-CUTTER.

SPECIFICATION forming part of Letters Patent No. 702,513, dated June 17, 1902.

Application filed August 24, 1900. Serial No. 27,873. (No model.)

*To all whom it may concern:*

Be it known that I, WESLEY R. WELSH, a citizen of the United States, residing at Parkesburg, in the county of Chester and State of Pennsylvania, have invented certain new and useful Improvements in Stalk-Cutters; and I do hereby declare the following to be a full, clear, and exact description of the invention, such as will enable others skilled in the art to which it appertains to make and use the same.

This invention relates to improvements in a stalk-cutting machine of that class in which a number of cutting bars or blades radially disposed are given horizontal rotation by an axle or shaft rotating in one direction by a pair of wheels rotating forward and remaining stationary when said wheels stand still or turn backward to raise or lower said cutting-blades, as may be required, as well as to maintain them in said horizontal position.

The object of the invention is the production of a machine that may be readily moved over rows of standing stalks, especially such as the stubble or butt-ends of cornstalks, cutting them off at desired points above the ground, so that it may be conveniently plowed or otherwise treated.

The elements of the invention will severally and at large appear in the following description, and they will be specifically pointed out in the appended claims.

The purposes of the invention are attained by the mechanism, devices, and means illustrated in the accompanying drawings, with similar reference characters to designate like parts throughout the several views, in which—

Figure 1 is a plan of a stalk-cutting machine embodying the elements of the invention, with portions of the moving shafts removed. Fig. 2 is a sectional elevation taken on the line $x\ x$ in Fig. 1; and Figs. 3, 4, 5, 6, and 7 are views showing elements and portions in detail and combination used in the construction.

In the drawings is shown a supporting-frame A, comprising horizontally-disposed side rails $a$, having cross-bars $a'$ placed underneath, and bolts $a^2$ through their bodies, with nuts on their threaded ends binding the bars and rails together, one bar being at the forward ends of the side rails and the other bar at a prescribed distance forward of their rearward ends. The side rails are centrally provided on their under sides with bearing-blocks A', through which are journaled the outer ends of an axle or shaft $A^2$, held sidewise in place by having rigidly secured thereto collars $A^3$, engaging against the outer faces of said bearing-blocks, the collars having in their peripheral surfaces ratchet-teeth or recesses $a^3$. (Best shown in Fig. 3.) On the ends of the shaft, outside of the collars and freely turning, are journaled the hubs of wheels $A^4$ and held in place by washers and cotter-pins $a^4$. The vertical inner faces of the hubs are provided with spring-pawls $A^5$, securely affixed, as by angular studs $a^5$, to engage said ratchet-teeth, rotating said shaft as the wheels roll forward and allowing it to remain stationary as said wheels stand still or turn backward.

Above the frame A, flush with its forward edge and between its side rails, is arranged a similar but somewhat smaller frame B, comprising side rails $b$, lying adjacent to said former side rails, and having cross-bars $b'$, placed thereon with bolts $b^2$ through their bodies and nuts on their threaded ends binding the bars and rails together, one bar being at the forward ends of the side rails and the other bar a prescribed distance rearward. These frames are pivoted together practically directly above the axis of the axle-bearings by trunnion-joints B', having their members $b^3\ b^4$ respectively secured to the side rails $b$ and $a$, as by bolts and nuts $b^5$, the former, $b^3$, having the trunnion ends and the latter, $b^4$, the trunnion-bearings.

To the under faces of the cross-bars $b'$ are rigidly secured the rear ends of a pair of shafts or thills $B^2$, as by bolts and nuts $b^6$, and being provided with a singletree $B^3$, whereby a horse may be used to move the machine. These cross-bars have also secured to the middle points of the under faces the ends of a strip or plate $B^4$, as by bolts and nuts $b^7$, to support the adjusting or regulating devices yet to be described.

At the rearward end of the frame A is arranged a rod or shaft C, having its extremities journaled in bearings $c$, secured to the upper faces of the side rails $a$, as by bolts and nuts $c'$, while collars C', secured to the shaft, as by set-screws $c^2$, and engaging against the inner faces of the bearings, serve to keep the shaft sidewise in place. Depending somewhat centrally from this shaft is a hanger $C^2$, comprising a vertical tubular portion $c^3$, having at its upper end a yoke-bar $c^4$, with upwardly-projecting end arms $c^5$, provided at their upper ends with hub-rings $c^6$, sleeved on the shaft and through which set-screws $c^7$ serve to rigidly secure the hanger in place, the tubular portion serving to support a vertical shaft and the space above the yoke-bar and between its end arms permitting the operation of a sprocket and a bevel gear-wheel, all yet to be described, while the lower end of the hanger is forwardly provided with an eye-lug $c^8$ to be engaged by the lower end of an adjusting connecting-rod, also yet to be described.

To turn freely on the axle-shaft $A^2$ or to have said axle-shaft turn freely in its hub is mounted a prescribed sprocket-wheel D, having the required number of teeth $d$. The hub having the required dimensions is provided near one end with a circumferential groove or recess $d'$, in which the end of a lever, yet to be described, is adapted to move it backward or forward and hold it in place, and at the other end with alternate end lugs and recesses constituting a clutch member $d^2$ to engage corresponding recesses and end lugs of a clutch member $d^3$, which is also mounted on and rigidly secured to said axle-shaft, as by a set-screw $d^4$, at the required point to bring said sprocket-wheel to the desired position and to rotate the same.

A sprocket-wheel E of prescribed dimensions, having teeth $e$, similar to those of the wheel D, before mentioned, and of equal pitch, is mounted on a prescribed hub $e'$ and rigidly secured thereto near to one end thereof, the hub being also sleeved or journaled on the shaft C, freely turning thereon between the hub-rings $c^6$ of the hanger, with its ends engaging against the adjacent faces of said rings to be kept thereby in place. Onto the longer portion of this hub and in close proximity to the sprocket-wheel is also rigidly secured a prescribed bevel gear-wheel E' of prescribed dimensions, with its teeth $e^2$ intermeshing with the teeth $e^3$ of a bevel-pinion $E^2$, which is rigidly secured to the upper end of a vertical shaft $E^3$, journaled through the tubular portion $c^3$ of the hanger, by which said shaft is rotatably supported and below which its lower end projects a prescribed distance. To the lower projecting end of this shaft is rigidly secured in any approved manner the central hub of a circular disk or plate $E^4$, horizontally disposed, its central hub $e^4$ engaging against the lower end of said hanger portion $c^3$, while on top of the disk are placed the inner ends of prescribed blades or knives $E^5$, radially disposed and rigidly secured in place, as by nuts and bolts $e^5$, passing through said inner ends and plate, said knives being provided with cutting edges $e^6$ to facilitate the cutting of the stalks, and to give the knives the required motion the sprocket-wheels D and E have a chain $E^6$ mounted thereon, the links $e^7$ of the chain engaging on the teeth $d$ and $e$ of the wheels. Now in order that the knives or cutting-blades $E^5$ may be controlled at pleasure, set in motion, or remain stationary a lever F is provided, being pivoted to the rearward side of the rearward cross-bar $b'$, as by a pivot or fulcrum-pin $f$, said lever having a downwardly and rearwardly curving arm $f'$, having, preferably, a bifurcated end $f^2$, provided at the extremities of its branches with inwardly-projecting pins $f^3$, which may be provided with rollers engaging in the groove $d'$, before mentioned, whereby the clutch members $d^2$ $d^3$ may be brought together or disconnected, said lever having also an upwardly-projecting arm $f^4$, having a hand-grip $f^5$ at its upper end and being provided with a locking-bolt $f^6$, with its lower end engaging in notches $f^7$, formed in the periphery of a semicircular arc F', secured to the upper face of the same cross-bar $b'$, the locking-bolt $f^6$ being operated by a connecting-rod $F^2$ and a spring-actuated grip-lever $F^3$.

To bring the forward ends of the frames A and B closer together or to spread them farther apart, as well as to hold them stationary in any position, an angle-lever G is provided, being pivoted to the near side edge of the strip $B^4$, before mentioned, as by a fulcrum pin or stud $g$, passing through its angle, with a cotter-pin holding the lever in place, said lever having its shorter arm $g'$ horizontally and forwardly disposed with its forward end pivotally connected, as by a link G', to the rearward edge of the forward end cross-bar $a'$, before mentioned, and its longer arm $g^2$ upwardly extending with a hand-grip $g^3$ at the upper end thereof, and being provided with a locking-bolt $g^4$ with its lower end engaging in notches $g^5$, formed in the periphery of a semicircular arc $G^2$, secured to the upper face of said strip $B^4$ and adjacent to said near side edge, the locking-bolt $g^4$ being operated by a connecting-rod $G^3$ and a spring-actuated grip-lever $G^4$. It will here be noted that by means of this lever and its connections with the forward ends of the frames B and A the rearward end of the frame A, with the stalk-cutting mechanism, may be elevated or depressed and maintained as required with the cutting-blades at the desired distance above the ground.

To maintain or hold the cutting-blades $E^5$ in a horizontal position or that they will move and work in a plane parallel to the ground, a lever H is provided, being pivoted to the far side edge of the strip $B^4$, above mentioned, as by a fulcrum-stud $h$, passing therethrough, and secured by a cotter-pin passing through the stud, the arm $h'$ of the lever downwardly disposed having its low end pivotally connected by a rod or link H' with the eye-lug $c^8$, before mentioned, and the arm $h^2$, upwardly extending with a hand-grip $h^3$ at the upper end thereof, said lever being provided with a locking-bolt $h^4$ with its lower end engaging in notches $h^5$, formed in the periphery of a semicircular arc $H^2$, secured to the upper face of said strip $B^4$ adjacent to the far side edge thereof, the locking-bolt being operated by a connecting-rod $H^3$ and a spring-actuated grip-lever $H^4$.

Having thus particularly ascertained and described the invention, fully shown and set forth in the manner in which it is performed, what is considered as new, and desired to be secured by Letters Patent, is—

1. In a stalk-cutter, a frame, a rock-shaft, a tubular hanger provided with arms having hubs at their upper ends, said hubs rigidly mounted on the rock-shaft, a vertical shaft mounted in said tubular hanger provided with a disk at the lower end, radial knives fixed to said disk, means for operating said vertical shaft and knives and means for keeping said knives in a plane parallel with the ground, said means consisting of a lever pivoted to the frame, and a link, one end connected to the tubular hanger and the opposite end to the lever, substantially as described.

2. In a stalk-cutter, a tilting frame having two members pivoted together with their forward end edges movable toward and from each other, means to effect said movement and to hold them in a fixed position, said frame mounted on an axle having wheels, a non-slidable clutch and a slidable clutch mounted on said axle, said slidable clutch having a sprocket-wheel secured thereto, means to move it into and out of engagement with said non-slidable clutch, a horizontal rock-shaft supported on the rear end of the frame, a tubular hub loosely mounted upon said rock-shaft having a sprocket-wheel and a beveled gear, a chain connecting said sprocket-wheel with the sprocket-wheel of said slidable clutch, a pivoted tubular hanger provided with arms having hubs rigidly mounted on the said horizontal rock-shaft, a vertical shaft mounted in said tubular hanger, provided with a disk, radial cutting-knives fixed to the top of said disk, and means for adjusting the hanger consisting of a lever having a link connected to the hanger, substantially as described.

3. In a stalk-cutter having a tilting frame as described and mounted on a revoluble axle with forwardly-engaging wheels on the extremities thereof and a sprocket-wheel secured to a clutch member movable back and forth thereon, with a rock-shaft end journaled in the rearward end of said frame and having a tubular hub carrying a sprocket-wheel and a beveled gear-wheel rotatably sleeved thereon, with an endless chain mounted on said sprocket-wheels, a tubular hanger with a yoke at the upper end thereof depending from said rock-shaft, said yoke embracing the ends of said tubular hub and the arms of the yoke rigidly secured to the shaft, a revoluble shaft journaled through said hanger having at its upper end a beveled gear-wheel intermeshing with the gear-wheel of the hub, and at its lower end a disk with radial cutting-blades having their inner ends rigidly secured to said disk, and a lever provided with a link connected to the hanger adapted to adjust said hanger for the purpose of keeping the knives in a plane parallel with the ground, substantially as described and for the purpose hereinbefore set forth.

In testimony whereof I affix my signature in presence of two witnesses.

WESLEY R. WELSH.

Witnesses:
　DANL. H. HERR,
　CHAS. E. LONG.